3,225,088
METHOD OF PRODUCING ALKALI METAL TEREPHTHALATE

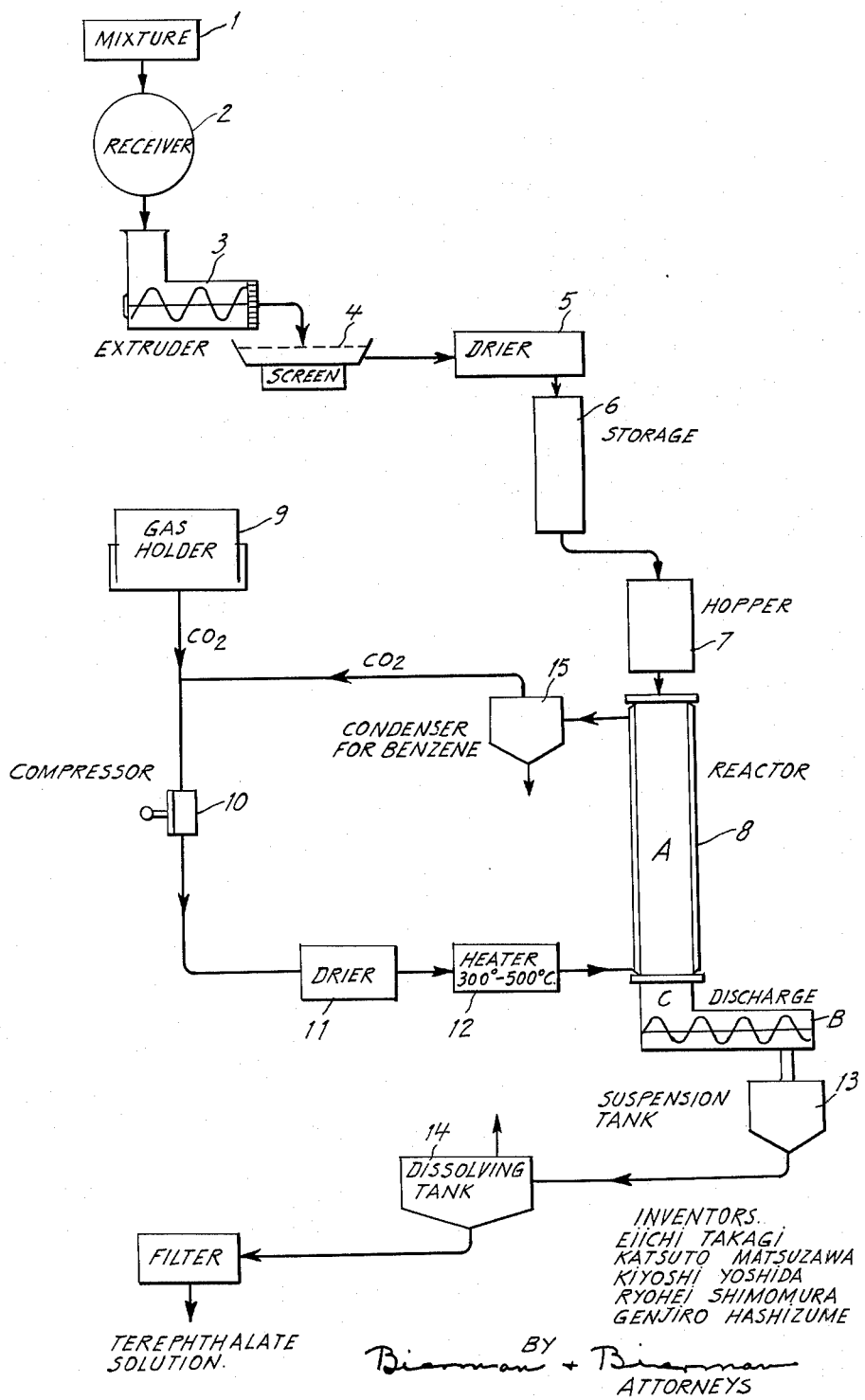

Eiichi Takagi and Katsuto Matsuzawa, Setagaya-ku, Tokyo, and Kiyoshi Yoshida, Shinjuku-ku, Tokyo, and Ryohei Shimomura and Genjiro Hashizume, Setagaya-ku, Tokyo, Japan, assignors to Mitsubishi Chemical Industries, Limited, Tokyo, Japan
Filed Sept. 18, 1962, Ser. No. 224,493
5 Claims. (Cl. 260—515)

The present application is a continuation-in-part of copending application Serial No. 813,261, filed May 14, 1959, now abandoned.

This invention relates to a method of producing alkali metal terephthalate and more particularly to the improvements in and relating to the method of producing alkali metal terephthalate by heating an alkali metal salt of a benzene carboxylic acid such as phthalic acid, isophthalic acid, and benzoic acid at a temperature above 300° C. either with or without a catalyst.

It has been known in the art that terephthalic acid may be produced by a process wherein an alkali metal salt of a benzene carboxylic acid such as phthalic acid, isophthalic acid, and benzoic acid or a mixture thereof is converted to the alkali metal salts of terephthalic acid by heating them at a temperature above 300° C. under either the presence or the absence of catalyst under either normal pressure or higher presure, and then a terephthalic acid is obtained by acidifying the resultant salts.

Also it has been known that the uniform heating of the raw materials taking part in the reaction is of utmost importance. Accordingly, in the prior art (1) raw materials provided for the reaction are charged in the state of finest powder into an autoclave equipped with a stirrer to carry out uniform heating of said powder through heating the exterior walls of said autoclave, or (2) raw materials are charged in the state of finest powder and in thin layers into a number of small reaction chambers which are provided by dividing the reaction vessel by means of metal plates for the purpose of uniform heating of said powder by taking advantage of the excellent heat conductivity of the metal plates and the sensible heat of carbon dioxide.

However, it is necessary with the conventional method that the autoclave is spacious enough to allow the free movement of the reaction materials; and that a powerful stirring at high speed is carried out for uniform heating and for preventing the charged materials from either aggregating into a sintered mass or from adhering to the vessel walls, keeping the materials in a state of finest powder. However, the designing of such an autoclave satisfying all of these requirements would be not only difficult and costly but also unsuited for the continuous operation. With regard to the method (2), the apparatus would be complex and costly and in addition, it is necessary to provide a free space at the upper portion of the reaction materials. Moreover, special care should be taken to prevent the powder from being carried off as the air in the void between the granules is replaced by carbon dioxide gas.

Thus it will be clearly understood that the existing methods are not advantageous from an economical point of view on the ground that the raw materials must be pulverized to finest powder and that a complex and costly apparatus must be employed in spite of the great difficulties met with in working the apparatus to produce alkali metal terephthalate.

Applicants have concluded from a study of the above described difficulties, that it may not be impossible to produce economically alkali metal terephthalate with an apparatus of simpler construction which permits uniform and quick heating of raw materials.

Based on the above conclusion we have made an extensive research to establish a method for producing alkali metal terephthalate advantageously and economically by forming the mixture of raw materials and catalysts in granules. The term "granule" in the specification and claims may include sphere, tablet, cylinder, squared cylinder, pellet, bar, ring, tube, splinter, perforated block and any of the other irregular shapes.

An object of the present invention is to provide a method for producing efficiently alkali metal terephthalate by heating uniformly alkali salt of a benzene carboxylic acid in the presence of a catalyst.

Another object of the invention is to provide a method of continuous production of alkali metal terephthalate by heating an alkali metal salt of a benzene carboxylic acid in the presence of a catalyst.

The former object is accomplished by a procedure comprising a step in which a mixture composed of alkali metal salt of at least one of benzene carboxylic acids selected from the group consisting of phthalic acid, isophthalic acid, and benzoic acid, mixed with the catalyst is formed into granules and a following step in which the resultant granules are charged into the reaction zone to come in contact with carbon dioxide gas therein under either normal or high pressure at temperatures ranging from 300 to 500° C.

The latter object is attained by a procedure comprising a step in which aforesaid raw material mixture in the form of granules are fed continuously into a reactor under normal or high pressure, a step in which said granules are brought into contact with preheated carbon dioxide gas, and a step in which the resultant alkali metal terephthalate granules are continuously discharged from said reactor.

Further objects of the present invention and the ways and means to accomplish the same will be clear by the following description.

The raw materials provided for the reaction according to the present invention include one or more alkali metal salts such as potassium salts of a benzene carboxylic acid selected from benzoic acid, phthalic acid and isophthalic acid. The catalysts to be employed along with said raw materials include at least one of metals such as cadmium, zinc, and lead; or the oxides of said metals, the chlorides of said metals and said metal salts of organic acid or inorganic acids, and the mixtures of these catalysts and promoters such as potassium iodide, potassium chloride, and potassium bromide.

According to the present invention the mixture of raw materials and catalysts is used always in the shape of granules.

The size of the granule should be selected so as to permit uniform flow of heating gas passing through the voids between the granules charged into the reactor and uniform conduction of heat as well as penetration of heating gas in the granules. The shortest dimension of the granule should range from about 1 to about 30 mm. preferably 3 to 15 mm., while the longer dimension is not limited. The factors which govern the selection of the shape and the size of the granule appropriate for the process include the kind of raw materials provided for the reaction, the type of the operation, the conditions under which the reaction takes place, and the capacity of the reaction vessel. The moisture content of the granules is usually kept within 1.0%, preferably less than 0.1%.

In a preferred embodiment of the invention, the above-mentioned raw materials and catalysts are mixed together, if necessary kneaded with a small amount of water added to facilitate the subsequent shaping, and then formed into granules. The device to be employed for the shaping may be of various types including extruder, tabletizer, pelletizer, and the like.

The granules prepared in the manner as described in the foregoing are charged into the reaction zone in accordance with the invention, and brought into contact with the carbon dioxide gas drawn therein under either normal pressure or high pressure up to 500 atmospheres and temperatures ranging from 300 to 500° C. Accordingly, the granules are uniformly admixed and effectively heated due to the heat conduction from the exterior walls of the reactor and the sensible heat of the carbon dioxide gas existing in the voids between the granules without resorting to any means for stirring and the like to accelerate the movement of granules inside the reactor. Consequently the alkali metal salt of terephthalic acid, e.g. potassium salt thereof is obtained in granules through the heat treatment. In the case where the raw material is alkali metal salt of benzoic acid, an approximately theoretical amount of benzene is obtained as a by-product.

Particularly in the case where the alkali metal salt of phthalic acid alone is employed as the raw material, there occurs sometimes fusion which interferes with the uniform heating. Therefore, it is desirable to select the catalyst in respect of type and amount, to add a suitable quantity of alkali metal salt of benzoic acid or isophthalic acid to an alkali metal salt of phthalic acid or to gradually elevate the reaction temperature.

In practicing the present invention it is not necessary to employ such a complex and costly reaction apparatus as was required with conventional method. Namely, the appropriate reactor required for practicing the invention comprises merely a heat-resisting and pressure-resisting tube or a tower of simple construction provided with a heating apparatus. A rotary kiln may be used for this purpose. Such a reactor, e.g., a reaction tube provided with a heating apparatus which is 30 cm. in inner diameter and 400 cm. in height, is charged with granules each of which is of a cylindrical shape and 4 to 8 mm. in diameter and 40 to 20 mm. in length, said granules being a mixture composed of, e.g., potassium benzoate and catalyst consisting of cadmium chloride and potassium iodide, heated carbon dioxide gas is drawn therein for ½ hr. at 400° C. and 30 kg./cm.² pressure, to cause the reaction to take place. In the course of the process, potassium benzoate is changed to potassium terephthalate in the shape of granules as charged and benzene is produced as a by-product.

The granules thus obtained contain alkali terephthalate, which is the principal constituent, a small amount of unreacted raw material and addition agent. The granules are withdrawn from the reactor and dissolved in water as with the conventional method; the catalyst is then filtered; and the filtrate is acidified to obtain terephthalic acid at 95% yield.

One of the most important characteristics of the present invention resides in producing alkali metal terephthalate in a continuous manner, particularly with the moving bed system employing a tube or tower as reactor. The granules are fed in from one end of the reactor, brought into contact with heated carbon dioxide gas under the above-mentioned conditions and the product in the form of granules is discharged from the other end, a moving bed system being formed in the tube or tower.

For further consideration of the continuous process for making alkali metal terephthalate which we believe to be novel and our invention, refer to the attached drawing, specification and claims:

The single figure of the drawing is a flow sheet showing an example of the continuous process according to the present invention for making alkali metal terephthalate by the use of potassium benzoate as the raw material. The raw material and the catalyst are admixed in the kneader 1; the resultant mixture passing through the receiver 2 is molded into granules in the extruder 3. The granules are screened with a sieve 4, dried in the dryer 5 and conveyed to the granules storage tank 6. The granules are then continuously charged through the hopper 7 into the top of the reactor 8.

On the other hand carbon dioxide gas drawn from the gas holder 9 passing through the compressor 10 and the gas dryer 11 is heated to above 300° C. in the heater 12, and then conducted into the reactor 8 which comprises the reaction zone A, the discharge part B and intermediate part C. An adequate lagging is required for the reaction zone A which in some cases calls for jacket heating, and a screw conveyor may be provided in the discharge part B. The hopper 7 and the reactor 8 are held under pressure. Potassium benzoate in the form of granules is changed to potassium terephthalate in the reaction zone A. The resultant potassium terephthalate granules are withdrawn continuously by the discharger B through the intermediate part C, thus constituting the moving bed system in the reaction zone A.

For example, in the case where the cylindrical granules which are 4 to 8 mm. in diameter and 4 to 20 mm. in length are charged at the rate of 124 kg./hr. into a reactor which is 30 cm. in inner diameter and 400 cm. in height, and the carbon dioxide gas which is heated to the temperature of about 400° C. is drawn under the pressure of 10 to 30 atmospheres thru the reactor at the rate of about 300 m.³ (N.T.P.)/hr., potassium benzoate is changed to potassium terephthalate in 60 minutes of contact time, turning out benzene as a by-product at the rate of 26 kg./hr.

The reaction product granules are successively discharged to the suspension tank 13 containing water at the rate of 95 kg./hr. The aqueous suspension of alkali metal terephthalate and catalyst thus obtained is heated to dissolve said terephthalate in the dissolving tank 14, and the insoluble matter is filtered off with the filter. Then the filtrate is treated in a conventional manner to produce terephthalic acid at a yield of 95% or more.

The carbon dioxide gas is withdrawn from the upper part of the reactor along with benzene which is produced as a by-product. The carbon dioxide is separated from the benzene in condenser 15 and sent back to the carbon dioxide current course for circulation. The continuous process according to the invention shows a striking efficiency in obtaining alkali metal terephthalate.

The outstanding feature of the invention resides in the shaping of the raw materials into granules prior to feeding thereof into a reactor. As has been described in the foregoing, in the prior art the raw materials are provided for the reaction in the form of powder. To the contrary, the raw materials according to the invention are shaped into the granules through a suitable means said granules taking part in the reaction so as to result in novel and striking effects as enumerated in the following:

(1) Simplicity in the working and the construction of the apparatus according to the invention offers many advantages in the commercial production of alkali metal terephthalate. Granules supplied to the reactor, according to the invention, are brought into contact with carbon dioxide gas at a high temperature so that efficiency is developed in obtaining alkali metal terephthalate. Accordingly, the invention avoids the necessity of employing a reactor provided with a high speed and powerful stirrer of a high price. Nor is there required a complex and costly apparatus consisting of a number of small reaction chambers divided with partition walls made of metal plate.

(2) As compared with the existing method the bulk density of the granules to be used according to the invention is greatly increased. As a result, the capacity of the reactor is conspicuously increased with the raw materials in the form of granules. According to the invention, raw materials in the form of granules can be charged uniformly in every part of the reactor so that the bulk density of the raw materials in the reactor becomes considerably higher than in the case of the conventional method. For example, while only 40 kg. of powdered raw material is treated with the conventional method employing a 100 liter reactor, 60 kg. of raw material in the form of cylinders which range from 4 to 8 mm. in diameter and 4 to 20 mm. in length is treated with the same reactor according to the present invention.

(3) According to the present invention the heating of raw materials can be carried out uniformly and quickly. By virtue of numerous voids existing between the separate granules, uniform and close contact is created between carbon dioxide gas and the granules which are thus uniformly and very quickly heated particularly through the sensible heat of the carbon dioxide gas. For example, in the case of raw material granules each of which is 4 mm. in diameter are charged into a reactor, which is 35 cm. in inner diameter and provided with a jacket heater, at 400° C. and carbon dioxide gas heated to 400° C. is simultaneously introduced thereto at a space velocity of 2,000 l./hr./cm.$^2$, it will take only 20 minutes before the central part of the reactor is heated to the highest attainable temperature. Should the pulverized raw materials instead of granules be charged in the reactor, it will take as long as 46 hrs.

The above fact clearly shows the superiority of the invention which makes inside heating possible by passing heated carbon dioxide gas through the reactor. Thus according to the invention, it requires only a short time before the reaction temperature is attained. In addition, on account of maintaining consistent pressure and temperature at the desired degree in the reactor the occurrence of side reaction due to local heating and the decrease in the partial pressure of carbon dioxide can be avoided. In consequence alkali metal terephthalate is obtained quickly and efficiently.

(4) Continuous production of alkali metal terephthalate is performed on a commercial scale with much ease. Since the conversion of alkali metal benzene carboxylate to alkali metal terephthalate is due to the heterogeneous reaction of solids with gas at high temperature and in some cases under pressure, the continuous production of alkali metal terephthalate on a commercial scale has been regarded as troublesome and no favorable method for the same has been disclosed in the prior art. In solving this problem the present invention provides an economical and continuous production method as has been described in the foregoing.

In view of the above effects it is clearly understood that the present invention demonstrates an appreciable increased utility as compared with the conventional method.

The invention will be described in detail by way of preferred embodiments. Obviously modifications and alterations will occur to others upon a reading and understanding of this specification, and it is our intention to include all such modifications and alterations insofar as they come within the scope of the appended claims.

*Example 1*

A mixture consisting of 1600 g. of potassium benzoate, 70 g. of cadmium carbonate, and 50 g. of potassium iodide was pulverized and kneaded together with a small amount of water and molded with an extruder into cylindrical granules, each of which was 4 mm. in diameter and 7 mm. in length and then made dry sufficiently. A charge of 720 g. of the granules was placed for heating in a reactor, which was 40 mm. in inner diameter and 1,000 mm. in length, carbon dioxide gas being drawn under pressure thereinto. The temperature inside the reactor was elevated to 400° C. in 1½ hrs. under the pressure of 30 kg./cm.$^2$. Under these conditions the reaction was further continued for 1½ hrs. The reaction product of white or grey granules weighing 560 g. was composed largely of potassium terephthalate, containing cadmium carbonate, and potassium iodide. Also benzene was produced in theoretical amount as a by-product.

The product was dissolved in water; insoluble catalyst was recovered by filtering and the filtrate was acidified to precipitate terephthalic acid. By filtering and subsequent drying terephthalic acid was obtained. The yield was theoretical. The melting point of dimethyl terephthalate obtained by esterification of said terephthalic acid was 140° C.

*Example 2*

A mixture consisting of 1,210 g. of potassium phthalate, 3,4,5, g. of cadmium carbonate, and 600 g. of potassium iodide was molded by means of a tabletizer to tablet-like granules, each of granules being 6 mm. in diameter and 3 mm. in thickness. The granules were then made thoroughly dry. A charge of 720 g. of the granules was placed in the same reactor as in Example 1 and carbon dioxide gas was drawn therein to cause reaction for 2 hrs. at the temperatures of 410 to 420° C. and under the pressure of 10 kg./cm.$^2$. The reaction product of white-greyish granules weighing 718 g. was composed of largely potassium terephthalate, containing cadmium carbonate, and potassium iodide. By treating this product in the same way as in Example 1, terephthalic acid of the same grade was obtained with 87% yield. In addition, 40 g. of unreacted phthalic acid and polycarboxylic acid as by-products were recovered from the filtrate which was free from the terephthalic acid.

*Example 3*

The same cylindrical reactor as illustrated in the attached drawing, which was 300 mm. in diameter and 4,000 mm. in height, was employed. A mixture consisting of 203 kg. of potassium benzoate, 4.38 kg. of cadmium carbonate, and 16.8 kg. of potassium iodide was fed to the kneader 1 for kneading together with a small amount of water. By the use of the extruder 3 the mixture was formed into cylindrical granules, each of which was 6 mm. in diameter and 12 mm. in length, and screened with the sieve 4 and made dry with the dryer 5 to about 0.1% moisture or less. The carbon dioxide gas was supplied from the gas holder 9 to the compressor 10. The gas was compresed to 20 kg./cm.$^2$ and then heated to 430° C. with the heater 12, the temperature of the reaction zone A with a jacket heater being maintained at 430° C.

The granules were charged to the reactor 8 from the hopper 7 at the rate of 168 kg./hr. while heated carbon dioxide gas was admitted to the reactor at the rate of 300 m.$^3$ (N.T.P.)/hr. to come into contact with the granules in counter current and then withdrawn from the top of the reactor 8 along with benzene vapor which was obtained as a by-product. The suitable time of the granules in the reaction zone A was estimated at about 30 min. and it is not desirable to keep the granules staying in the reaction zone A for more than 1 hr. because the color of the product would darken. The reaction product was discharged at the rate of 131 kg./hr. to the suspension tank 13 with the screw conveyor in the discharger part B. An aqueous suspension thus obtained was heated to dissolve potassium terephthalate in the dissolving tank 14, and the insoluble matter was filtered off. By acidifying the filtrate terephthalic acid was obtained with a yield of 95%. Benzene withdrawn with carbon dioxide was caught in the condenser 15 at the rate of 35 kg./hr. The carbon dioxide gas was sent back to the carbon dioxide gas current source for recirculation.

*Example 4*

The same cylindrical reactor as illustrated in the attached drawing, which was 300 mm. in diameter and 4,000 mm. in height, was employed. A mixture consisting of 93.4 kg. of potassium benzoate, 1.0 kg. of cadmium carbonate, 1.46 kg. of zinc carbonate and 4.16 kg. of potassium bromide were fed to the kneader 1 for kneading together with a small amount of water. By the use of the extruder 3 the mixture was formed into cylindrical granules, each of which was 4 mm. in diameter and 8 mm. in length, and screened with the sieve 4 and made dry with the dryer 5 to about 0.1% moisture or less. The carbon dioxide gas was supplied from the gas holder 9 to the compressor 10. The gas was compressed to 20 kg./cm.$^2$ and then heated to 450° C. with the heater 12. The granules were charged into reactor 8 from hopper 7 until the former was filled with the granules. Then, the charge of granules continued while discharging the granules from the bottom of reactor 8 until a state of equilibrium was reached. Simultaneously, heated carbon dioxide gas was admitted to the reactor to come in contact with the granules in counter current and to be withdrawn from the top of the reactor along with benzene vapor.

In the stationary state, the granules were charged into the reactor at a 110 kg./hr. rate; the reaction product was discharged at a 86 kg./hr. rate; carbon dioxide gas heated to 450° C. was circulated at a 350 m.$^3$ (N.T.P.)/hr. rate; and benzene was recovered at a 24.2 kg./hr. rate.

Thus, the starting granules continuously charged from the top of the reactor were continuously displaced downwards while completing the reaction, the form of the granules being maintained as initially, and the reaction product in form approximately the same as the initial form was continuously discharged from the bottom of the reactor. It was observed that a mark given on the surface of a starting granule was clearly identified on the surface of a discharged granular product which had been subjected to the reaction. The thus obtained reaction product was subjected to the same treatment as in Example 3 to obtain terephthalic acid at a 51 kg./hr. rate.

The following table shows the results of tests performed with starting granules having various compositions in various forms which were subjected to the same treatment.

Due to the size of the granules and the velocity of the inert gas passing upwardly through the bed of granules in the above examples, the granules pass downwardly in a static bed, they do not float in the gas and channeling is avoided. The upward velocity of the gas is lower than the velocity necessary for fluidizing the bed.

Because of the extremely high purity of terephthalic acid obtained in accordance with the present method, the terephthalic acid may be directly applied to the manufacture of polyethylene terephthalate for use as textile material with satisfactory results.

We claim:

1. A method of producing alkali metal terephthalate which comprises shaping into granules a mixture composed of an alkali metal salt of benzene carboxylic acids selected from the group consisting of phthalic acid, isophthalic acid, and benzoic acid and mixtures thereof and a catalyst selected from the group consisting of cadmium, zinc and lead and oxides and salts thereof, said granules having a thickness of about 1 mm. as the minimum to about 30 mm. as the maximum, introducing said granules into a reactor to form a bed therein, said bed having voids between said granules, passing carbon dioxide gas at temperatures of about 300°–500° C. through said granules at a velocity lower than the minimum fluidizing velocity of said bed, said granules moving downward in a non-fluidized bed and said gas flowing upwardly countercurrent to said granules and through said voids, thereby to convert said alkali metal salt of benzene carboxylic acid to the alkali metal terephthalate.

2. A method as claimed in claim 1 wherein the granules of the mixture are substantially free from inert matter.

3. A method as claimed in claim 1 characterized in feeding the granules of the mixture into the reactor to come in contact with carbon dioxide gas at the temperature of 300 to 500° C., under the pressure of 1 to 500 atm., and discharging the converted alkali metal terephthalate in granules from said reactor.

4. A method as claimed in claim 1 characterized in continuous feeding the granules of the mixture to an end of the reactor, bringing said granules into contact with carbon dioxide gas in counter current at the temperature 300 to 500° C., under the pressure of 1 to 500 atm., and continuous discharging the converted alkali metal terephthalate in granules from the other end of said reactor.

5. A method as claimed in claim 1 wherein the granules of the mixture are charged into the reactor to come in contact with carbon dioxide gas, said carbon dioxide gas being heated at the temperature of 300 to 500° C. prior to being introduced to the reactor.

| No. | Composition of starting granule | Catalyst | a Mm. | b Kg./hr. | c ° C. | d Kg./cm.$^2$ | e NTP m.$^3$ | f Kg./hr. | g Kg./hr. | h Kg./hr. |
|---|---|---|---|---|---|---|---|---|---|---|
| | Alkali metal salt of benzene carboxylic acid: | | | | | | | | | |
| 1 | 95.0 kg. of potassium benzoate. | 1.1 kg. of CdCl$_2$ and 3.94 kg. of KI. | 10×15 | 100 | 430 | 20 | 350 | 77 | 47 | 21 |
| 2 | 55.9 kg. of potassium benzoate and 42.3 Kg. of dipotassium o-phthalate. | 0.64 kg. of CdCl$_2$ and 1.16 kg. of KI. | 15×17 | 120 | 420 | 20 | 350 | 104 | 64 | 14 |
| 3 | 94.6 kg. of potassium benzoate. | 1.1 kg. of CdCl$_2$, 0.8 kg. of ZnCl$_2$ and 3.5 kg. of KCl. | 20×20 | 90 | 445 | 20 | 350 | 69 | 42 | 19.5 |
| 4 | 56.1 kg. of potassium benzoate and 42.4 kg. of dipotassium isophthalate. | 0.3 kg. of CdCl$_2$ and 1.3 kg. of KBr. | 30×50 | 120 | 420 | 10 | 350 | 103 | 68 | 13 |
| 5 | 93.4 kg. of potassium benzoate. | 1.0 kg. of CdCO$_3$, 1.46 kg. of ZnCO$_3$ and 4.16 kg. of KBr. | 20×20 | 100 | 450 | 20 | 350 | 77.9 | 47.5 | 22 |

NOTE 1:
a. Size of granule: Cylindrical form (diam×length).
b. Charging rate of granule.
c. Temperature of CO$_2$.
d. Pressure.
e. Flowing rate of CO$_2$.
f. Discharging rate of reaction produce.
g. Yield of terephthalic acid.
h. Amount of recovered benzene.

NOTE 2.—The granule No. 4 was given two round holes each of which was 5 mm. in diameter, located in the neighborhood of the central axis and lengthwise parallel to the axis.

References Cited by the Examiner

UNITED STATES PATENTS

| | | | |
|---|---|---|---|
| 2,794,830 | 6/1957 | Raecke et al. | 260—515 |
| 2,891,992 | 6/1959 | Raecke et al. | 260—515 |
| 2,914,483 | 11/1959 | Downard | 260—515 X |
| 2,931,829 | 4/1960 | Schenk | 260—515 |

FOREIGN PATENTS

| | | |
|---|---|---|
| 1,102,134 | 3/1961 | Germany. |
| 811,952 | 4/1959 | Great Britain. |
| 815,180 | 6/1959 | Great Britain. |
| 833,019 | 4/1960 | Great Britain. |
| 868,338 | 5/1961 | Great Britain. |

LORRAINE A. WEINBERGER, *Primary Examiner.*

LEON ZITVER, *Examiner.*